United States Patent
Han et al.

(10) Patent No.: US 6,625,535 B2
(45) Date of Patent: Sep. 23, 2003

(54) ADAPTIVE POWERTRAIN BRAKING CONTROL WITH GRADE, MASS, AND BRAKE TEMPERATURE

(75) Inventors: Ed E. Han, Ann Arbor, MI (US); Todd R. Berger, Saline, MI (US)

(73) Assignee: General Motors Corporation, Detroit, MI (US)

( * ) Notice: Subject to any disclaimer, the term of this patent is extended or adjusted under 35 U.S.C. 154(b) by 10 days.

(21) Appl. No.: 09/932,205

(22) Filed: Aug. 17, 2001

(65) Prior Publication Data

US 2003/0036839 A1 Feb. 20, 2003

(51) Int. Cl.$^7$ .......................... B60K 41/20; B60K 41/04
(52) U.S. Cl. ..................... 701/65; 701/54; 701/70; 477/94
(58) Field of Search .......................... 701/65, 70, 54, 701/57, 84, 87, 94, 107, 118; 303/3; 180/197; 477/94, 107, 118

(56) References Cited

U.S. PATENT DOCUMENTS

| | | | | |
|---|---|---|---|---|
| 5,187,977 A | | 2/1993 | Koschorek et al. | 73/146 |
| 5,267,158 A | | 11/1993 | Sakaguchi et al. | 74/866 |
| 5,319,555 A | * | 6/1994 | Iwaki et al. | 701/57 |
| 5,711,712 A | * | 1/1998 | Graf | 477/121 |
| 5,892,437 A | * | 4/1999 | Scheibe et al. | 340/467 |
| 6,099,085 A | * | 8/2000 | Eckert | 303/3 |
| 6,177,773 B1 | * | 1/2001 | Nakano et al. | 318/376 |
| 6,287,237 B1 | * | 9/2001 | Graf et al. | 477/94 |
| 6,332,354 B1 | * | 12/2001 | Lalor et al. | 73/121 |

* cited by examiner

Primary Examiner—Gary Chin
(74) Attorney, Agent, or Firm—Anthony Luke Simon

(57) ABSTRACT

A method and apparatus for adapting powertrain braking to mass, grade, and brake temperature. Vehicle mass is determined using a vehicle speed sensor and an tractive effort model based on engine-torque delivered, torque converter multiplications, and transmission ratio and tire rolling radius effects. Road grade is continuously calculated and altitude change is calculated based on grade and distance traveled. To achieve an ideal amount of powertrain braking, powertrain braking is directed towards a designed coast performance target based on deceleration as a function of vehicle speed. Fuzzy logic is used to evaluate driver intentions, grade load conditions, terrain conditions, brake conditions and other vehicle information to determine the actual, optimal powertrain braking control. A real time brake thermal model is developed to provide increased powertrain under extreme brake conditions. The powertrain braking efforts are limited when restricted by available tractive efforts.

9 Claims, 4 Drawing Sheets

VSPD Low

Coast Accel. Desires Braking

Not Slowing Fast

Brake Energy High

Altitude Decrease High

Brake Intent High

Coast Accel. Desires Braking Low

VSPD High

Brake Intent Low

No Downshift Time High

Altitude Decrease Low

+ Delta TPS Low

ADAPTIVE POWERTRAIN BRAKING CONTROL WITH GRADE, MASS, AND BRAKE TEMPERATURE

BACKGROUND OF THE INVENTION

1. Field of the Invention

The present invention relates in general to control systems in automatic transmissions and, specifically, to a powertrain braking control system adaptive to grade, mass, and brake temperature.

2. Description of the Art

A typical driver, when driving down a hill or a mountain, makes frequent application of the brakes (brake applies). In vehicles with automatic transmissions, the powertrain control may enable engine braking to assist or substitute for driver brake applies. This powertrain braking is a method for the powertrain to supply braking torque to the driven wheels. Adaptive braking in this fashion can improve driver comfort, provide ideal coast performance or driveability, and improve conventional disc or drum brake life. Generally, the ideal amount of powertrain braking is dependent upon the terrain and the combined vehicle weight. Although the vehicle dynamic equation of mass, grade, tractive efforts, rolling resistance, aerodynamic load, and acceleration is well known, real time solution of the equation using these factors has not been performed without a mass or grade sensor. Example prior art systems lump both grade and mass load together and compares it with a predetermined value based on speed, or simply looks at the vehicle deceleration rate to determine if powertrain braking is needed. These efforts fail to comprehend or adapt to different types of terrain. They also fail to adapt to brake temperature conditions.

Additionally, a driver's driving style and intentions also play an important factor in powertrain braking. Prior art developed various fuzzy and neurologic based algorithms based on brake switch and acceleration and accelerator pedal position to incorporate the driver's intentions. However, such existing logic is easily confused by light versus heavy brake applies.

SUMMARY OF THE INVENTION

The present invention provides a method and apparatus to provide an optimum amount of powertrain braking that adapts to grade, mass, and brake temperature. The invention performs a real time estimation of vehicle mass and road grade without the use of either a grade or mass sensor. Using the vehicle mass, road grade and the prior vehicle braking capability, powertrain braking control is predicted to achieve a coast performance target—deceleration as a function of vehicle speed. Fuzzy logic is used to evaluate driver intentions, grade load conditions, terrain conditions, brake conditions, and other vehicle information to determine the actual optimal powertrain braking control. In addition, a real time brake thermal model is developed to provide increased powertrain braking under extreme brake conditions. Finally, available tractive efforts are continuously monitored to limit powertrain braking efforts to insure vehicle stability.

By delivering the same desirable vehicle coast performance under various terrain and load conditions, enhanced brake performance is achieved as a secondary benefit. Downhill rides will be more comfortable since the driver will not be preoccupied with controlling the vehicle speed with frequent brake applies. The invention is intended to significantly reduce the amount of energy the brake absorbs during downhill driving, resulting in an improvement in brake life. Since the algorithm of the present invention is math based, development efforts in calibration and validation are minimal. Additionally, the algorithms rely on sensors commonly used on powertrains, allowing a common or portable implementation approach for multiple applications without additional equipment costs.

BRIEF DESCRIPTION OF THE DRAWINGS

The various features, advantages and other uses of the present invention will become more apparent by referring to the following detailed description and drawings in which.

DETAILED DESCRIPTION OF THE PREFERRED EMBODIMENTS

Figure 1:
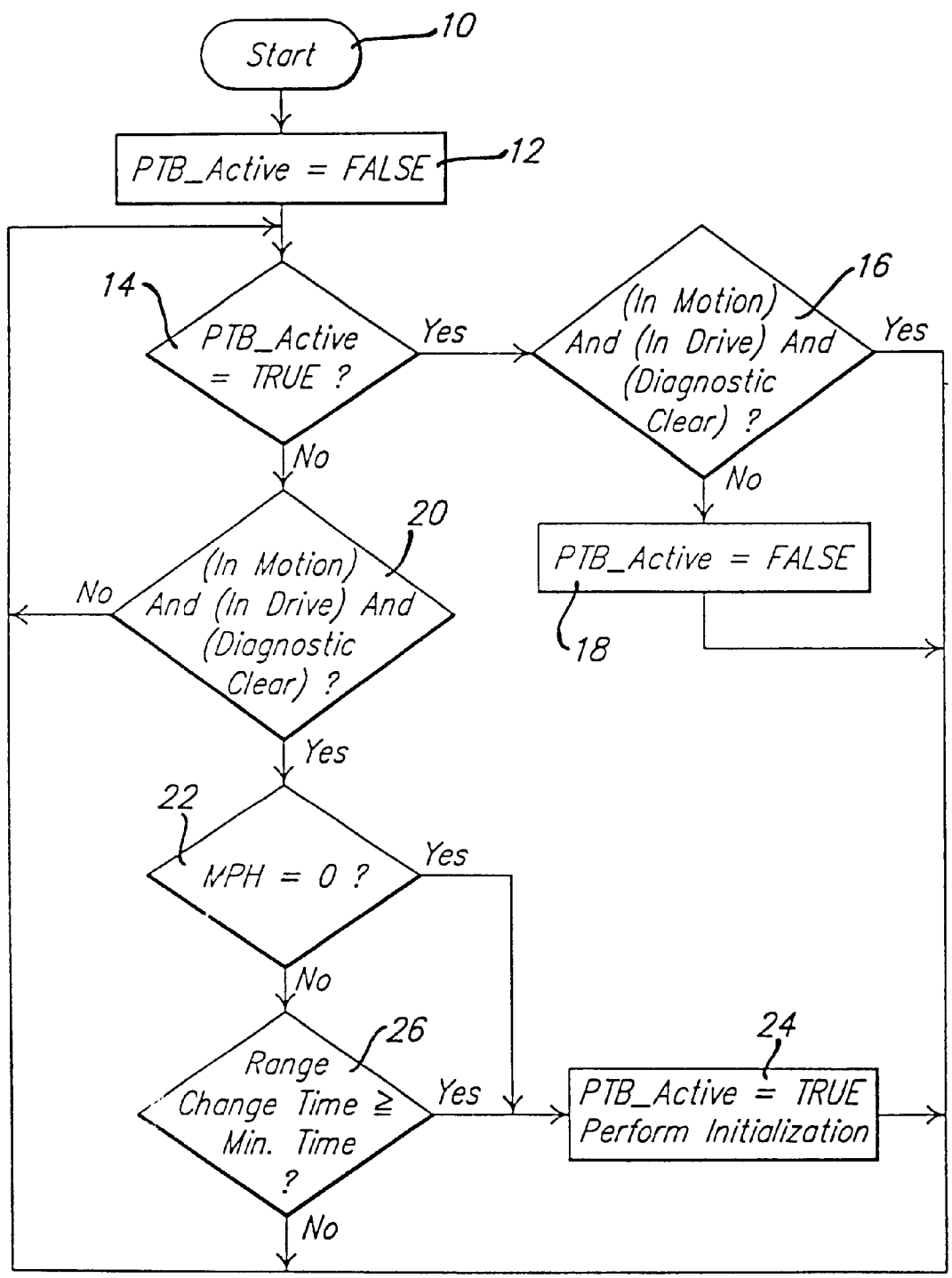
FIG. 1 illustrates the activation logic of powertrain braking control in block diagram format.

Referring now to FIGS. 1–4 of the drawings, there is depicted a powertrain braking control method that, using grade, mass, and brake temperature, provides an optimum amount of powertrain braking. Generally, the method is performed in the engine controller 100, which is a conventional digital computer used by those in the art for engine control, including the standard elements of the central processing unit (CPU) 102, random access memory 104, read-only memory 106, analog to digital convertor(s) 108 input/output circuitry 110 and clock circuitry 112. The controller 100 is activated upon application of ignition power to an engine 114, and it carries out a series of operations stored in an instruction-by-instruction format in memory for providing engine control, diagnostic and maintenance operations. In particular, the engine controller 100 receives signals from various sensors and makes a decision on whether or not to shift the transmission 116.

Referring now to FIG. 1, shown is the logic continuously executed by the CPU to determine when powertrain braking is enabled. This activation logic ensures the powertrain braking feature is only active in drive ranges. Specifically, the procedure starts at step 10 and advances to step 12, where PTB_Active is set equal to FALSE. The procedure starts upon activation of the engine controller by ignition power. After the initialization in step 12, a continuous loop begins at step 14 with the inquiry of whether PTB_Active is equal to TRUE. If PTB_Active is TRUE, then the procedure advances to a three-part query in step 16. First, a query is made as to whether the vehicle is in motion, which merely means that it is operating. Second, a query is made as to whether the transmission of the vehicle is in drive range. Finally, a query is made as to whether a diagnostic code indicates a problem with the powertrain braking system. In step 16, if the vehicle is no longer in motion, or if its transmission is no longer in drive, or a diagnostic code indicates a problem with the powertrain braking system, then the procedure advances to step 18 where PTB_Active is set equal to FALSE. From step 18, the procedure returns to step 14.

Returning now to Step 14, if PTB_Active is not equal to TRUE, then the procedure advances to step 20. In step 20, the same queries made in step 16 are performed. If the vehicle is not in motion, or its transmission is not in the drive range, or a diagnostic code indicates a problem with the powertrain braking system, then the procedure returns to step 14. If, however, the vehicle is in motion and its transmission is in the drive range, and all diagnostic codes are clear, the procedure advances to step 22.

In step 22, the speed of the vehicle is checked to see if it is currently at zero. If the vehicle speed is at zero in step 22, the procedure advances to step 24, where PTB_Active is set equal to TRUE. Also, the variables used in the powertrain braking algorithm are initialized. Among the variables initialized are torque and acceleration. Specifically, if acceleration is equal to zero, torque and acceleration are initialized at calibrations for a minimum speed and nominal load. The procedure then returns to step 14.

Returning now to step 22, if the vehicle speed is greater than zero, the procedure advances to step 26 to a further query. In step 26, the amount of time that has passed since the last change in transmission range is compared to a predetermined minimum length of time. Specifically, the procedure checks the amount of time that has passed since the transmission range shifted out of park, neutral or reverse. This step ensures that the vehicle is not moving backwards when the vehicle speed is not zero. If the amount of time that has passed since the range change is greater than or equal to the predetermined minimum length of time, then the procedure advances to step 24. In step 24, PTB_Active is set equal to TRUE. Also, the variables used in the powertrain braking algorithm are initialized as described above. After initialization in step 24, the procedure returns to step 14.

Returning now to step 26, if the amount of time that has passed since the range change is less than the predetermined minimum length of time, then the procedure returns to step 14. The loop beginning at step 14 runs continuously until engine shutdown. Preferably, sampling occurs at a 100 millisecond sampling interval.

Figure 2:
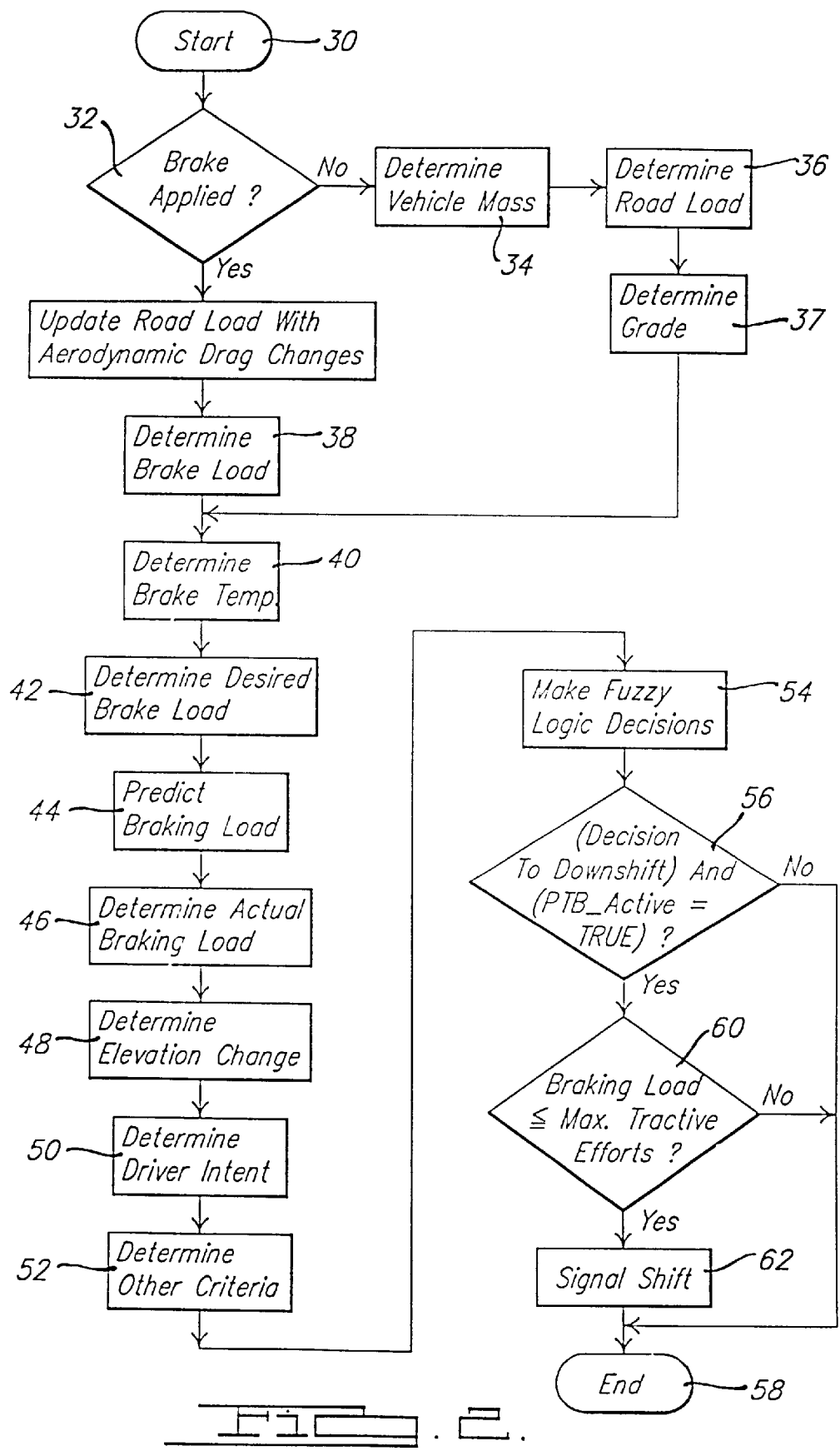
FIG. 2 is a block diagram illustrating a flow of operations the carrying out a method of the present invention.

Referring now to FIG. 2, shown as the series of operations used to determine whether a transmission range change is desirable to activate powertrain braking to assist driver brake applies. Such a control sequence begins in FIG. 2 at step 30 and proceeds to step 32, where a query is as to whether the brake is applied. Whether or not the brake is applied is indicated by the vehicle's brake switch. If the brake is not applied, the control sequence proceeds to step 34. In step 34, the vehicle mass is determined according to the following formula:

$$M=(T_2-T_1)/[RR*(A_2-A_1)];$$

where:
M is the vehicle mass;
$T_1$ is the axle torque at time 1;
$T_2$ is the axle torque at time 2;
RR is rolling radius;
$A_1$ is the vehicle acceleration at time 1; and
$A_2$ is the vehicle acceleration at time 2.
The vehicle acceleration is preferably the output of a Kalman filter. The vehicle mass determined is limited to high and low calibrated values. The variable $T_1$ is updated to equal the value of $T_2$, and the variable $A_1$ is updated to equal the value of $A_2$.

After vehicle mass is determined in step 34, road load is determined in step 36. Road load is determined according to the following formula:

$$RL=(T/RR)-(M*A);$$

where:
RL is the road load;
T is the current value of axle torque; and
A is the current value of vehicle acceleration.
Like the vehicle mass, the road load so determined is limited to high and low calibrated values.

After the road load is calculated in step 36, the control sequence proceeds to step 37. In step 37, the grade is determined according to the following formula:

$$\text{Grade}=[(M*A)-(T/RR)+(C_d*V^2)]/M_g+C_{roll};$$

where:
Grade is the current grade, which is the sine of the grade angle;
$C_d$ is the drag coefficient;
$M_g$ is the vehicle weight; and
$C_{roll}$ is the rolling coefficient.

After the grade is calculated in step 37, the control sequence proceeds to step 40. The values for vehicle mass, road load, and grade are updated at predetermined intervals while the brake is not applied. When the brake is applied, vehicle mass, road load, and grade are held constant. When the brake is released, vehicle mass, road load, and grade are recalculated.

Referring now to step 32, if the brake is applied, brake load is determined in step 38 using the known vehicle mass and road load. Specifically, brake load is determined according to the following formula:

$$BL=(T/RR)-(M*A)-RL;$$

where:
BL is the brake load. Here, RL is related to several factors expressed as
RL=(Rolling Resistance)+(Aerodynamic Drag)±(Grade Load). The Aerodynamic Drag is updated as vehicle speed changes.

After the brake load is calculated in Step 38, the control sequence advances to Step 40, where brake temperature is determined using a brake thermal model. The purpose of the brake thermal model is to estimate the degree of brake energy, rather than the exact brake temperature. The brake thermal model considers brake load distribution, brake energy generation, and brake cooling effects in determining the rotor temperature. The brake thermal model is recursively executed at each sampling interval to give the brake rotor temperature according to the following formula:

$$T=T+(BL*V)*KV\_Brake\_Fraction(BL)*\Delta t-(T-T_{air})*KV\_Brake\_Cooling\_Coef(V)*\Delta t;$$

where:
T is the brake rotor temperature;
V is the vehicle speed;
KV_Brake_Fraction (BL) is the portion of brake load carried by a particular brake as a function of the overall braking load, preferably supplied by a calibration table;
$\Delta t$ is the sampling interval;
$T_{air}$ is the air temperature; and
KV_Brake_Cooling Coef(V) is the brake cooling coefficient as a function of vehicle speed, preferably supplied by a calibration table.

After the brake rotor temperature is determined in step 40, the control sequence proceeds to determine the desired braking load based on an optimum coast acceleration performance that will best satisfy most drivers. In step 42, this is accomplished by means of the following formula:

$$\text{Desired Braking Load} = M * fcn_{decel}(V) - RL;$$

where:

$fcn_{decel}(V)$ is the desired coast performance for deceleration, which is a function of vehicle speed. This function can be implemented in a lookup table of deceleration as a function of vehicle speed, developed based up the known relationship between deceleration and vehicle speed. In one aspect of the invention, the deceleration provided is similar to that of coasting on a level road. In another aspect of the invention, it is a more conservative value.

Next, in order to match the desired braking load with the appropriate powertrain braking range, the braking load for each gear must be known or predicted. Braking load at a particular gear is mainly dependent on torque converter clutch status and the vehicle speed, modified with engine coolant temperature. In step 44, the braking load upon a range change is predicted by means of a lookup table, which lookup table is developed based on the well known relationships between gear, torque converter clutch status, vehicle speed, and braking load. The prediction so determined is multiplied by a modifier obtained from separate lookup table, which lookup table is developed based on the well known relationship of braking load and engine coolant temperature. If the breaking gear is not engaged, the lower braking gear will be the current gear, and the predicted braking load will be the current gear braking load with the braking element. Otherwise, the predicted braking load is that of the lower gear with the braking gear applied.

In step 46, the actual braking capacity in the current range (gear) is found by means of the same lookup table incorporating gear, torque converter clutch status, vehicle speed, and braking load. The capacity so determined is multiplied by a modifier obtained from the lookup table based on the well known relationship of braking load and engine coolant temperature. However, if the braking element is engaged, the actual braking capacity is zero.

Next, the decrease in elevation of the terrain in which the vehicle is traveling is calculated. Specifically, in step 48, the grade that was determined in step 37 is used to calculate the elevation (altitude) decrease when the grade is significant, that is, it is above a predetermined minimum value. The grade is used to recursively execute the following formula at each sampling interval to give the elevation decrease:

$$\text{Elevation} = \text{Elevation} + (\text{Grade} * V * \Delta t);$$

where:

Elevation is the decrease in elevation.

In step 50, a driver intent model is used to determine driver braking intent. Driver intent is incorporated into the decision on powertrain braking because a powertrain braking command that defeats the driver's intent would be objectionable. For example, a driver may choose to accelerate on a downgrade rather than brake, or an experienced driver may choose very heavy manual braking to slow down, in contrast to the normally desired coast performance. The driver intent model is an accumulator that performs like a capacitor, continuously accumulating the driver braking intent. When the driver indicates braking intent through a brake apply, the value of the accumulator increases. When the driver is not applying the brake, the value of the accumulator decreases. The accumulator also includes factors used to gradually reduce the past information to neutral, recognizing the fact that past intent no longer reflects current intent. Upon a powertrain braking range change, driver braking intent is reset.

When a driver keeps the brake constantly applied, the road load calculation is frozen. As a consequence, the brake load calculation is incorrect. If the driver does this for too long and shows the need for powertrain braking, a calibration function assures that a very large braking intent results.

After driver braking intent is determined in step 50, the control sequence advances to step 52, where other driveability criteria are analyzed. Specifically, when making powertrain braking decisions, additional criteria are used. For example, a downshift will only be commanded on brake applies to reduce the unexpected powertrain braking torque disturbance to the driver. Also, powertrain braking downshift upon a large speed decrease is inhibited. This is necessary because when a vehicle slows down, the coast performance model of step 40 often requires downshifts to keep the necessary powertrain braking efforts. However, when a driver momentarily stops or slows down and then resumes the previous speed, powertrain braking becomes too heavy and objectionable. Finally, when an upshift is inhibited due to powertrain braking, a throttle step-in may change the driver intent model such that an undesirable upshift results. Therefore, it is necessary to prevent the upshift during or immediately after the step-in.

After the additional driveability criteria is determined in step 52, the control sequence advances to step 54. In step 54 fuzzy logic is used to integrate the various information from the physical and behavioral models and the driveability criteria to make a powertrain braking shift decision. A weighting of one indicates a strong correlation with the truth function. A weighting of zero indicates little or no correlation with the truth function. Several of the truth functions are combined to form a fuzzy rule set. Based on the combined weight of the rule sets, a decision is made to increase or decrease the transmission range.

Figure 3A:
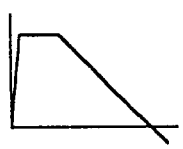
FIG. 3A is a series of graphs illustrating some of the powertrain braking downshift truth functions used in the fuzzy logic to make a decision to either command a powertrain braking downshift or not.
Figure 3A:
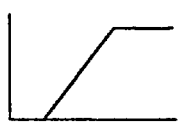
Figure 3A:
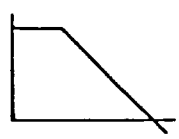
Figure 3A:
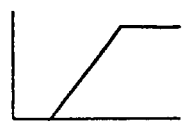
Figure 3A:
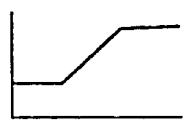
Figure 3A:
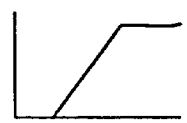
Figure 3B:
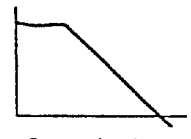
FIG. 3B is a series of graphs illustrating some of the truth functions for a powertrain braking upshift decision.
Figure 3B:
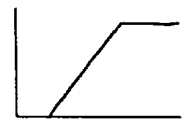
Figure 3B:
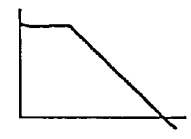
Figure 3B:
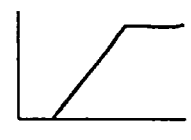
Figure 3B:
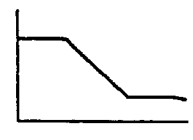
Figure 3B:
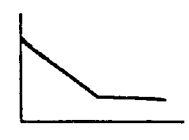
Figure 4:
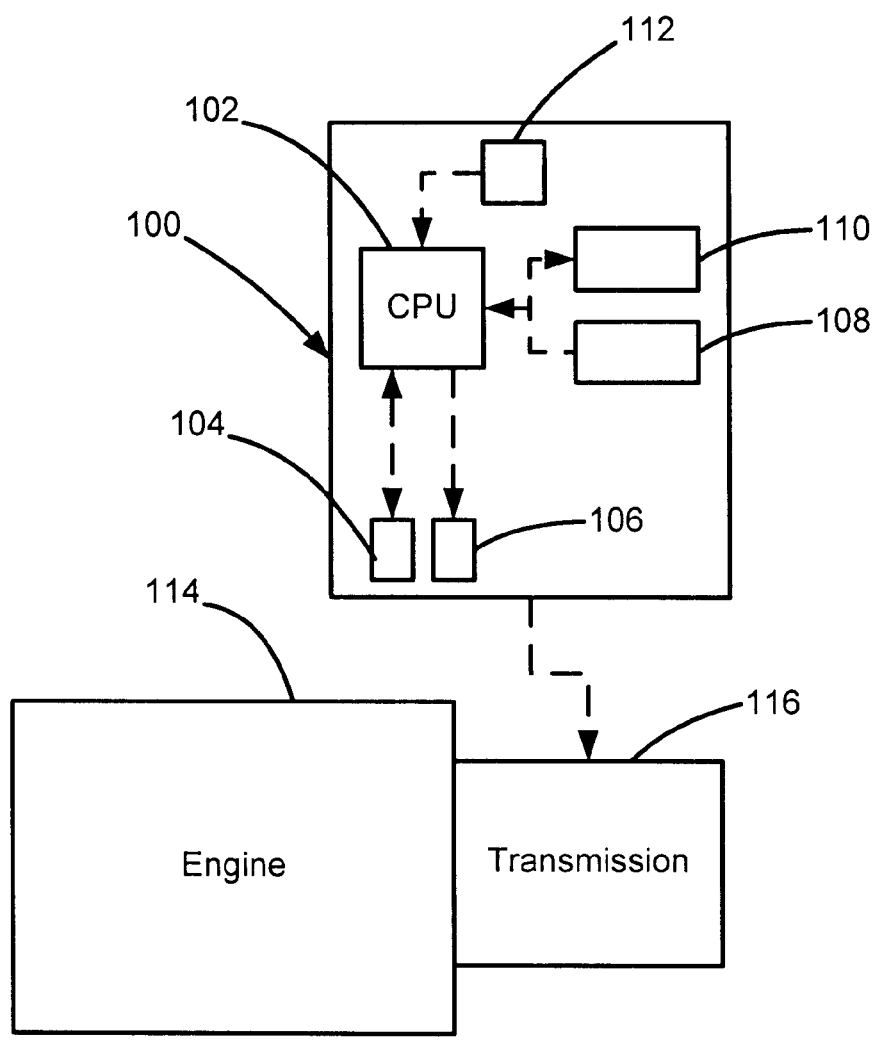
FIG. 4 is a schematic illustration of a vehicle powertrain braking control system.

By example, FIGS. 3A and 3B illustrate some of the powertrain braking truth functions used in making the decision. In FIGS. 3A and 3B, the following descriptions apply:

VSPD is the vehicle speed;

Coast Accel Desires Braking is based on the difference between the desired braking load determined in Step 42 and the actual braking capacity determined in step 46, which indicates whether the desired coast performance requires more or less powertrain braking;

Brake Intent is the driver braking intent based on the output of the driver intent model of step 50; and Altitude Decrease is the change in altitude based on the accumulated values of the elevation decrease determined in step 48, which provides a measure of the type of terrain in which the vehicle is traveling.

Additional truth functions in FIG. 3A include:

Brake Energy, which is a measure of brake energy based on the estimated brake rotor temperature as calculated in step 40; and Slowing Fast, which is a measure of the decrease in vehicle speed, and is used to inhibit powertrain braking when a driver momentarily stops or slows down and then resumes the previous speed as described in step 52.

Fuzzy logic evaluates all the truth functions and makes a discrete decision to either command a powertrain braking downshift or not. If all of them are true, then most likely a decision to downshift will result. By example, if vehicle speed is low (VSPD Low), the coast performance model (Coast Accel Desires Braking) indicates a high desire for braking, the vehicle speed is not rapidly decreasing (Not Slowing Fast), the brake temperature, and thus the braking energy is high (Brake Energy High), the change in altitude is high (Altitude Decrease High), and the driver indicates a high braking intent (Brake Intent Hi), then a decision to downshift will likely result.

In contrast, FIG. 3B illustrates some of the truth functions for powertrain braking upshift decision making. FIG. 3B includes the additional truth functions:

Downshift time is a period of time that has passed since a downshift last occurred; and Delta TPS is a measure of the change in the throttle position sensor, which is used to inhibit an upshift due to powertrain braking during or immediately after a throttle step-in as described in step 52.

Again, fuzzy logic evaluates all the truth functions and makes a discrete decision to either command a powertrain braking upshift or not. If all of them are true, then most likely a decision to upshift will result. By example, if the vehicle speed is high (VSPD Hi), the coast performance model indicates a low desire for braking (Coast Accel Desires Braking Low), the downshift time is not high (No Downshift Time High), the change in throttle position is low (+Delta TPS Low), the change in altitude is low (Altitude Decrease Low), and the driver indicates a low braking intent (Brake Intent Low), then a decision to upshift will likely result.

Returning now to FIG. 2, once the decisions to upshift or downshift are made using the fuzzy logic in step 54, the control sequence advances to step 56, where the decisions are combined with other shift patterns, such as traction control and diagnostic commands. Further, the result of the activation logic of FIG. 1 is checked to see if PTB_Active is still equal to true. The result of this step is a decision to downshift or not. If the decision is not to downshift, the control sequence ends at step 58. If the decision is to downshift, the control sequence advances to step 60.

In step 60, a query is made as to whether the braking load required by the powertrain braking system is less than or equal to the maximum available tractive effort. If the braking load is less than or equal to the maximum available tractive effort, then the range decrement is allowed in step 62. If, however, the powertrain braking load required is greater than the maximum tractive efforts, then the control sequence ends at step 58.

Thus, the present invention provides a powertrain braking control adaptive to mass, grade, and brake temperature. A vehicle coast performance, based on a coasting deceleration desired by end customers, is used as the control target. Brake improvement is a secondary benefit, resulting from a reduction in number of brake applies a driver needs to make during downhill driving. This invention should result in an improvement in brake life.

What is claimed is:

1. A method of controlling a level of powertrain braking in an internal combustion engine of a vehicle with a transmission and driven wheels, comprising the steps of:

determining a vehicle mass;

determining a road load; and shifting said transmission based on said vehicle mass and said road load to achieve a desired braking load.

2. The method according to claim 1, further comprising the step of:

blocking the step of shifting said transmission when an available tractive effort is insufficient.

3. The method according to claim 1, wherein the step of shifting said transmission based on said vehicle mass and said road load to achieve a desired braking load is based on a shift decision and further comprises the step of:

using fuzzy logic to determine said shift decision.

4. The method according to claim 1, further comprising the steps of:

determining a driver braking intent;

determining a brake temperature; and determining a road grade, wherein said step of shifting said transmission is further based on the driver braking intent, the brake temperature, and the road grade.

5. The method according to claim 1, wherein the step of shifting said transmission supplies a braking torque to the driven wheels to achieve said desired braking load.

6. The method according to claim 1, further comprising the step of:

instructing a driver to command a manual shift of the transmission.

7. The method according to claim 1, wherein the step of shifting said transmission comprises the step of:

shifting the transmission into a lower braking gear.

8. An apparatus for controlling a level of powertrain braking in an internal combustion engine of a vehicle with driven wheels, comprising:

an automatic transmission:

a controller that determines a vehicle mass; and a road load and that shifts said automatic transmission based on said vehicle mass and said road lead to achieve a desired braking load.

9. The apparatus according to claim 8, wherein said controller prohibits shifting of said automatic transmission when an available tractive effort is insufficient.

* * * * *